US012643777B2

(12) United States Patent
Hobbs

(10) Patent No.: US 12,643,777 B2
(45) Date of Patent: Jun. 2, 2026

(54) VEHICLE AIR LIFT SYSTEM

(71) Applicant: Christopher Hobbs, Calgary (CA)

(72) Inventor: Christopher Hobbs, Calgary (CA)

(*) Notice: Subject to any disclaimer, the term of this patent is extended or adjusted under 35 U.S.C. 154(b) by 0 days.

(21) Appl. No.: 18/905,223

(22) Filed: Oct. 3, 2024

(65) Prior Publication Data

US 2026/0097938 A1 Apr. 9, 2026

(51) Int. Cl.
*B66F 7/20* (2006.01)

(52) U.S. Cl.
CPC .................................... *B66F 7/20* (2013.01)

(58) Field of Classification Search
CPC ...... B66F 7/18; B66F 3/35; B66F 3/40; B66F 7/20; B66F 3/24; B66F 7/085
See application file for complete search history.

(56) References Cited

U.S. PATENT DOCUMENTS

| | | | | |
|---|---|---|---|---|
| 3,843,092 A * | 10/1974 | Oehler | B62D 53/0864 254/2 R |
| 6,929,249 B1 * | 8/2005 | Kim | B66F 3/35 254/93 H |
| 9,598,270 B2 * | 3/2017 | Nielsen | B66F 3/35 |
| 10,384,506 B1 * | 8/2019 | Woods | B60G 11/28 |
| 2016/0051426 A1 * | 2/2016 | Hall | A47C 7/002 254/93 HP |

FOREIGN PATENT DOCUMENTS

| | | | | |
|---|---|---|---|---|
| CN | 202687871 U * | 1/2013 | |
| CN | 103193179 A * | 7/2013 | |
| CN | 104891386 B * | 9/2017 | B66F 7/28 |
| CN | 113800425 A * | 12/2021 | F16M 7/00 |
| KR | 940001675 Y1 * | 3/1994 | B66F 3/35 |

OTHER PUBLICATIONS

Machine Translation of CN 104891386.*

* cited by examiner

*Primary Examiner* — Diem M Tran
(74) *Attorney, Agent, or Firm* — Lewellyn Law, PLLC; Stephen Lewellyn

(57) ABSTRACT

A system and method for lifting a vehicle using compressed air is disclosed herein. The system includes a set of inflatable devices movable into an inflated position to lift the vehicle and an air-line assembly connectable to a compressed air supply and to the set of the inflatable devices to move the set of inflatable devices into the inflated position. The inflatable devices may have an airbag and an articulated frame that operates to support a lifted vehicle. The frame provides rigidity to the inflatable device and, when engaged in its extended position, prevents collapse if the airbag is deflated.

18 Claims, 15 Drawing Sheets

VEHICLE AIR LIFT SYSTEM

FIELD OF THE INVENTION

The present invention relates generally to the field of vehicle jacks and more particularly, relates to a pneumatic vehicle jack system

BACKGROUND OF THE INVENTION

There are various reasons why it is necessary to lift a vehicle off the ground. For example, when changing a tire, changing engine oil, inspecting brakes, etc. Most typically, to lift a vehicle off the ground, a car jack is used. A car jack is a mechanical lifting device operated by placing the car jack underneath the vehicle, positioning it underneath the jacking points of the vehicle, and then manually operating the car jack, either via pumping or winding (depending on the type of car jack used), to lift the vehicle.

However, there are many disadvantages to these mechanical car jacks. One such disadvantage is that the accurate positioning of the car jack and the subsequent manual pumping or winding of the car jack are time-consuming and laborious tasks. This is particularly true for tire shops and mechanic shops that consistently have to lift different vehicles. As such, a suitable solution is desired.

SUMMARY OF THE INVENTION

In view of the foregoing disadvantages inherent in the known vehicle jack art, the present disclosure provides a novel vehicle air lift system. The general purpose of the present disclosure, which will be described subsequently in greater detail, is to provide a system that allows for the lifting of a load, particularly a vehicle, using compressed air.

A system for lifting a vehicle using compressed air is disclosed herein. The system includes a set of inflatable devices configured for movement between an inflated position and a deflated position and an air-line assembly. The set of inflatable devices each includes a base, a main body, an inflation control unit, and a support plate. The base may include a substantially planar body. The main body may be attached to the base and may be defined by at least two airbags stacked vertically and sharing a common interior. Further, the support plate may be attached to the main body top.

The inflation control unit may be attached to the base and in communication with the common interior. The inflation control unit may include an inlet. The air-line assembly may include a conduit system and a main control valve. The main control valve may be configured for connection with a compressed air supply to intake compressed air into the air-line assembly, and the conduit system may be configured to supply the compressed air to the inlet of each of the set of inflatable devices, thereby moving the set of inflatable devices into the inflated position and lifting the vehicle.

An inflatable device for lifting a vehicle is disclosed. The inflatable device may have a frame having a top plate, a bottom plate, and a pair of articulating sides attached to and extending between the top and bottom plates, wherein articulation of the sides allows the upper plate and lower plate to move toward and away from each other between a collapsed position and an extended position. The device may further have an inflatable airbag disposed between the upper and lower plate and between the pair of articulating sides. The frame being moved from the collapsed position into the extended position by inflation of the airbag. The frame being releasably lockable in the extended position to prevent the frame collapsing upon deflation of the airbag.

For the purposes of summarizing the invention, certain aspects, advantages, and novel features of the invention have been described herein. It is to be understood that not necessarily all such advantages can be achieved in accordance with any one embodiment of the invention. Thus, the invention may be embodied or carried out in a manner that achieves or optimizes one advantage or group of advantages as taught herein without necessarily achieving other advantages as may be taught or suggested herein. The features of the invention, which are believed to be novel, are particularly pointed out and distinctly claimed in the concluding portion of the specification. These and other features, aspects, and advantages of the present invention will become better understood with reference to the following drawings and detailed description.

Numerous additional objects, features, and advantages of the present invention will be readily apparent to those of ordinary skill in the art upon a reading of the following detailed description of presently preferred but illustrative embodiments of the present invention when taken in conjunction with the accompanying drawings. The invention is not limited to a single application but is capable of various embodiments and of being practiced and carried out in numerous ways. Also, it is to be understood that the phraseology and terminology employed herein are for descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be made to the accompanying drawings and descriptive matter in which there are illustrated embodiments of the invention.

BRIEF DESCRIPTION OF THE DRAWINGS

The following drawings illustrate by way of example and are included to provide a further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the disclosure.

As discussed above, embodiments of the present disclosure relate to a vehicle jack and, more particularly, to a vehicle air lift system. Generally, the vehicle air lift system may include a set of four triple air bladder jacks connected together via air lines that work in unity to lift a vehicle completely off the ground in less than 30 seconds. As such, tire changes or rotations are made easy and time-effective.

Figure 1:
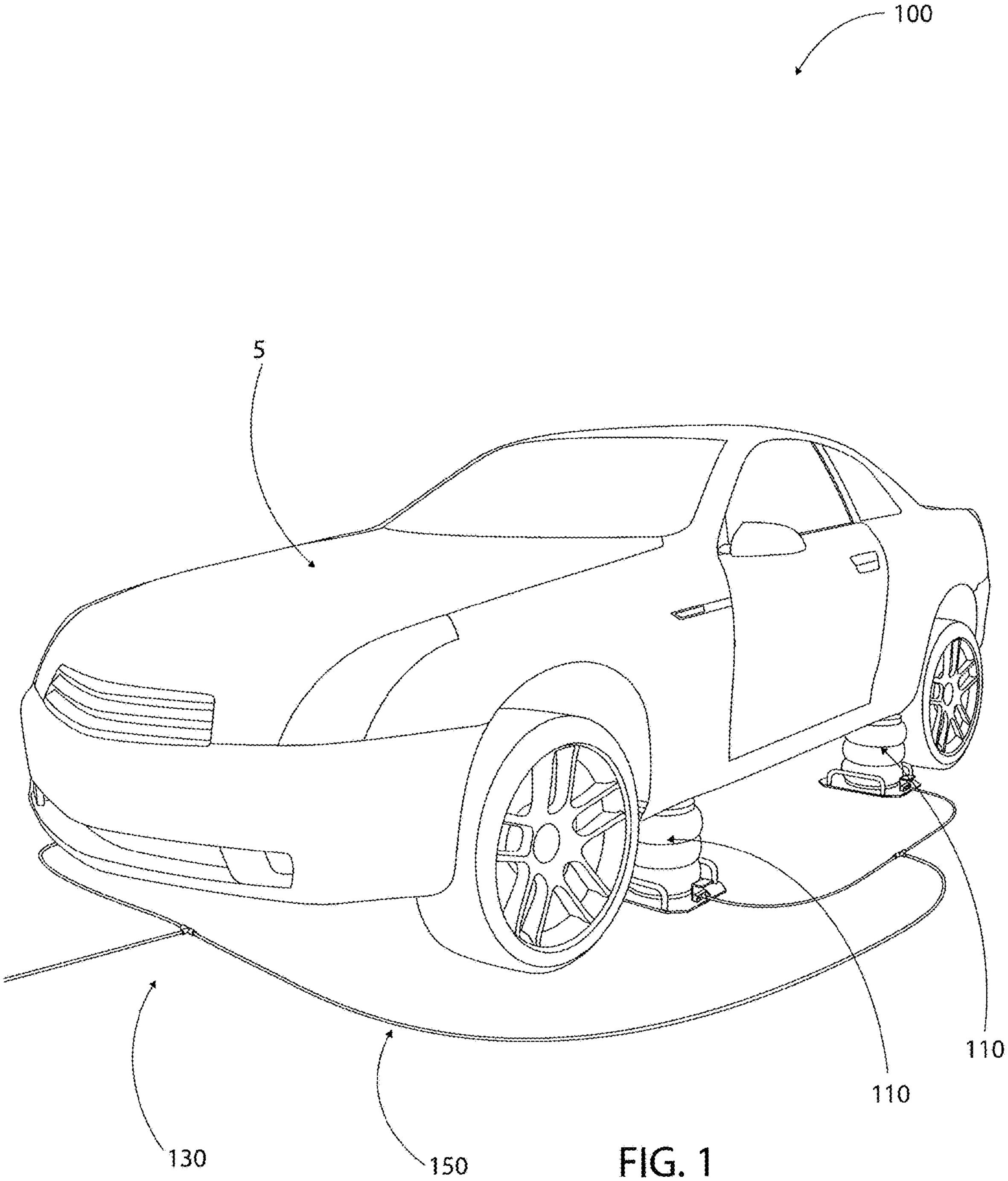
FIG. 1 is a front perspective view of a vehicle air lift system according to an embodiment of the disclosure shown being used to lift a vehicle using compressed air.
Figure 2:
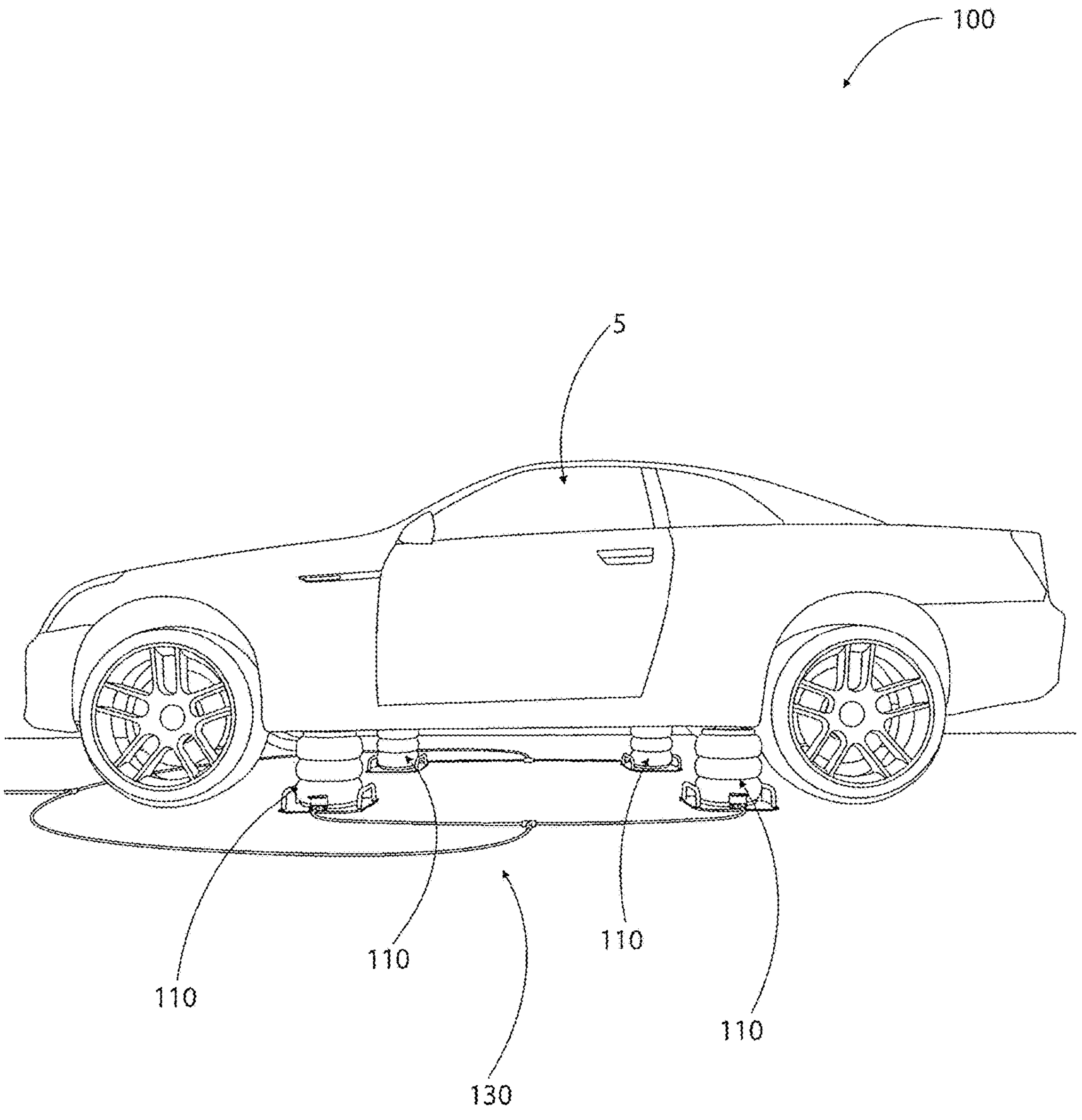
FIG. 2 is a side perspective view of the system of FIG. 1, according to an embodiment of the present disclosure.
Figure 3:
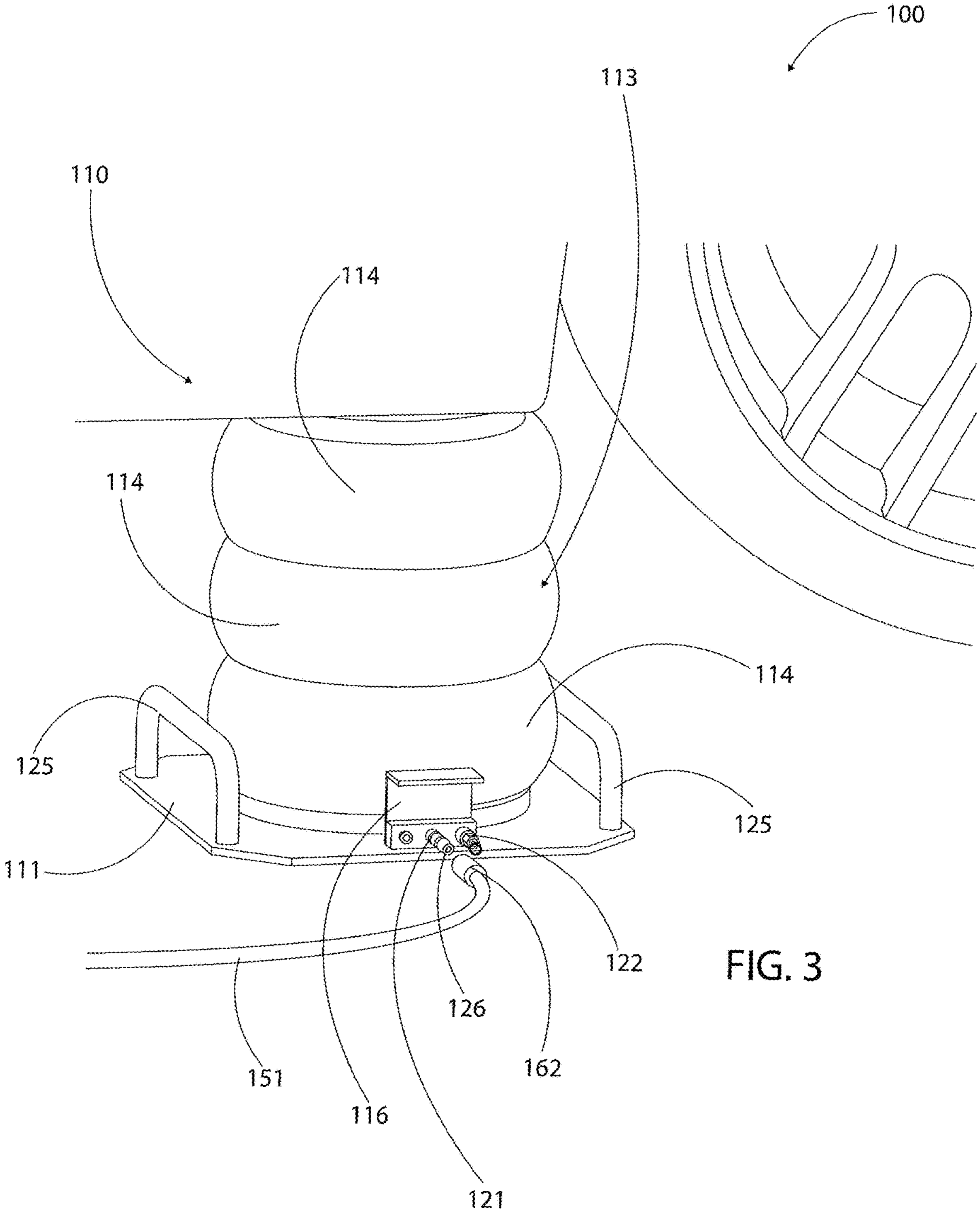
FIG. 3 is a close-up view of the system of FIG. 1 and illustrates an inflatable device according to an embodiment of the present disclosure.
Figure 4:
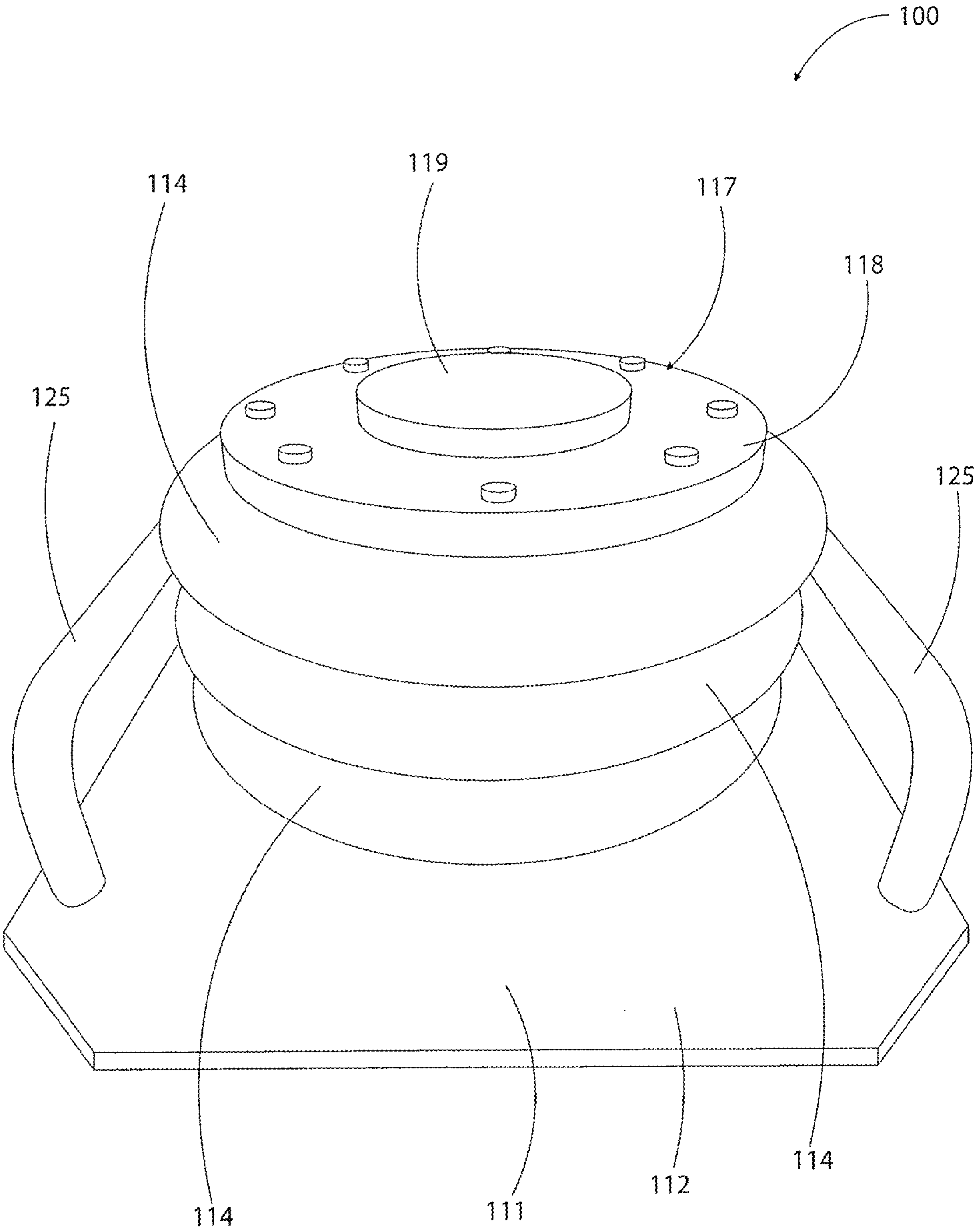
FIG. 4 is a rear perspective view of the inflatable device, according to an embodiment of the present disclosure.
Figure 5:
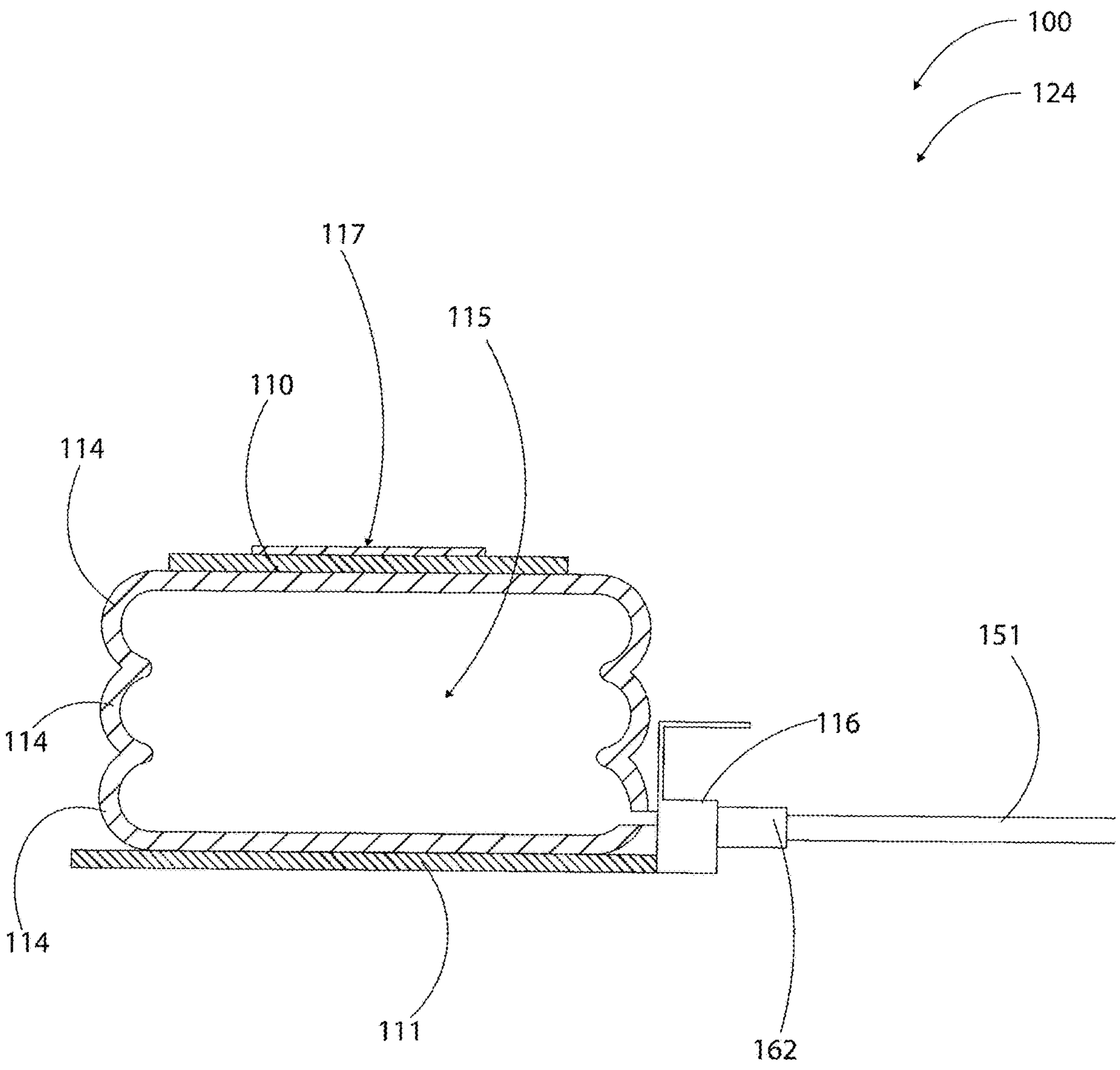
FIG. 5 is a partial cross-section view of the inflatable device in a deflated position, according to an embodiment of the present disclosure.

Referring now more specifically to the drawings by numerals of reference, there is shown in FIGS. 1-10, various views of a system 100 for lifting a vehicle using compressed air. As shown, system 100 may include a set of inflatable devices 110 and an air-line assembly 130. The set of inflatable devices 110 may be configured for movement between an inflated position 123 and a deflated position 124. As demonstrated in these figures and particularly in FIGS. 5-6, in the inflated position 123 (FIG. 6), the set of inflatable devices 110 may include a greater height than in the deflated position 124 (FIG. 5). As such, in the inflated position 123, the set of inflatable devices 110 may lift the vehicle 5 (FIGS. 1-2). Thereby, the set of inflatable devices 110 each act as a car jack. Preferably, the set of inflatable devices 110 may include four inflatable devices 110. As such, as shown in FIGS. 1-2, two of the four inflatable devices, 110, may be placed toward the rear of vehicle 5, and the other two of the four inflatable devices, 110, may be placed toward the front of vehicle 5.

As shown in FIGS. 3-6, each set of inflatable devices 110 may include a base 111, a main body 113, an inflation control unit 116, and a support plate 117. In some embodiments, each of the set of inflatable devices 110 may include a width of between 12-13 inches as measured from one side of base 111 to an opposite side of base 111 and a height of between 5-6 inches as measured from a bottom of the base 111 to a top of the support plate 117 when in the deflated position 124. It should, however, be appreciated that these measurements are given as examples and are not meant to limit the inflatable devices 110 to any particular size.

Figure 6:
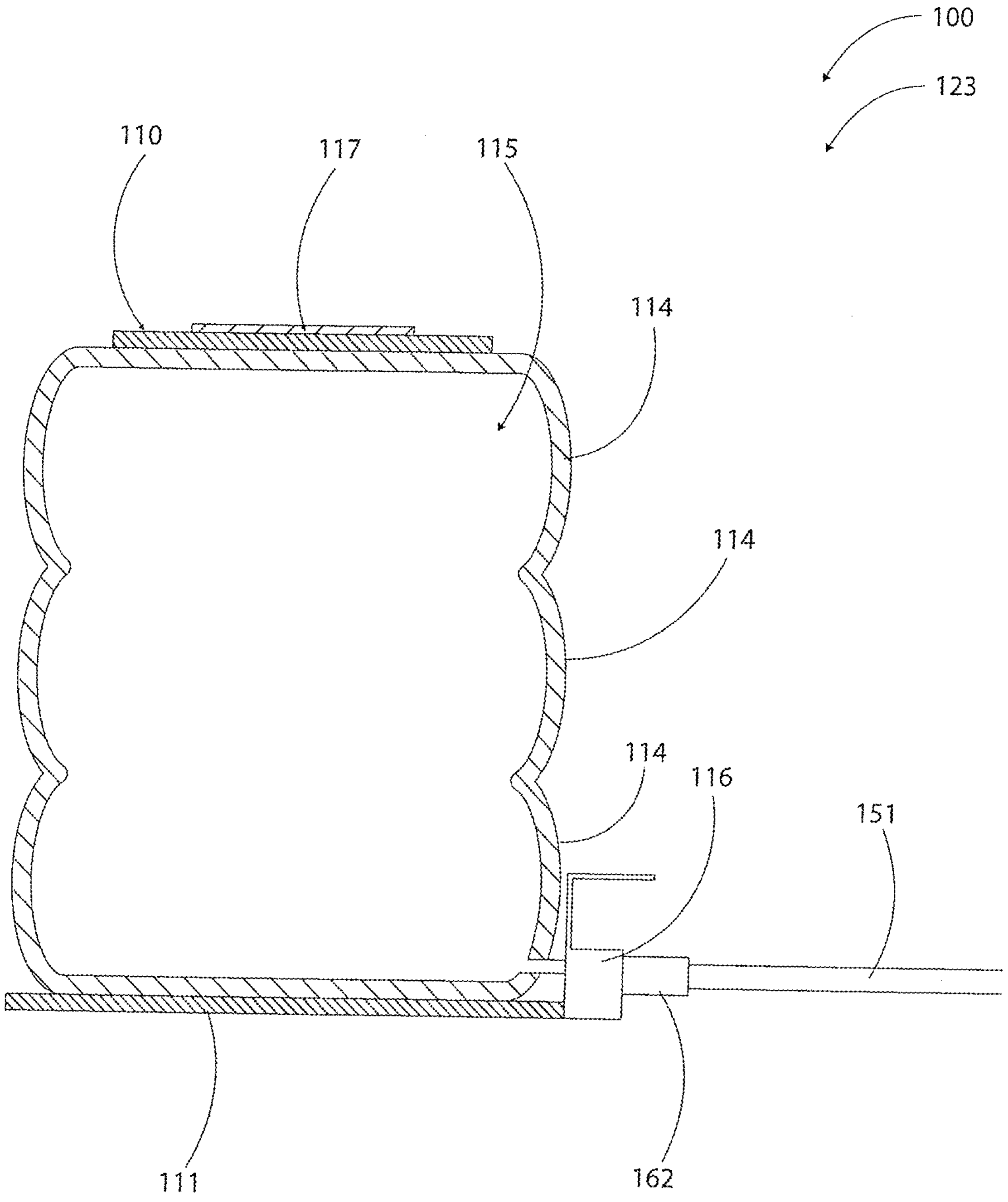
FIG. 6 is a partial cross-section view of the inflatable device in an inflated position, according to an embodiment of the present disclosure.

The base 111 may be made of a heavy duty material, such as a steel material, and may include a substantially planar body 112. Further, as shown in FIG. 3 particularly, base 111 may include a pair of handles 125 attached either side thereof, enabling a user to easily transport each inflatable device 110. The main body 113 may be attached to the base 111 and may extend upwardly (vertically) therefrom. The main body 113 may be defined by airbag 114 (FIGS. 5-6). Airbag 114 may be made from a durable rubber material.

As shown in FIGS. 4-6, the support plate 117 may be attached atop the main body 113. As shown in FIG. 4, the support plate 117 may include a first plate 118 and a second plate 119. The first plate 118 may be made from a heavy duty material, such as steel; and the second plate 119 may be made from a non-slip material, such as rubber. As shown in FIG. 4 particularly, the first plate 118 may be attached at a center of the main body 113 and may extend upwardly therefrom; and the second plate 119 may be attached at a center of the first plate 118 and may extend upwardly therefrom. As shown, the first plate 118 may include a larger diameter than the second plate 119. When using the system 100, the second plate 119 may be the portion that abuts a frame or jacking points of the vehicle 5, as demonstrated in FIG. 3. Thereby, the support plate 117 may aid in support of the vehicle 5 whilst preventing slipping of the vehicle 5 and/or damage to the vehicle 5 due to the rubber second plate 119.

As shown particularly in FIG. 3, the inflation control unit 116 may be attached to the base 111. The inflation control unit 116 may be in communication with the common interior 115 and may include an inlet 121 and an outlet 122. The inlet 121 may be configured for connection with the airline-assembly 130 to receive compressed air therefrom (thus moving the inflatable device 110 into the inflated position 123). In some embodiments, the inlet 121 may include a valve (not illustrated) that enables the user to selectively close or open the inlet 121. The outlet 122 may be configured to expel the compressed air from the common interior 115, thereby moving the inflatable device 110 into the deflated position 124. Outlet 122 may also include a valve (not illustrated). In some embodiments, the user may manually open the outlet 122 to expel compressed air. In additional embodiments, the outlet 122 may include a relief valve, enabling the inflation control unit 116 to automatically expel some compressed air if the common interior 115 is overfilled.

Figure 7:
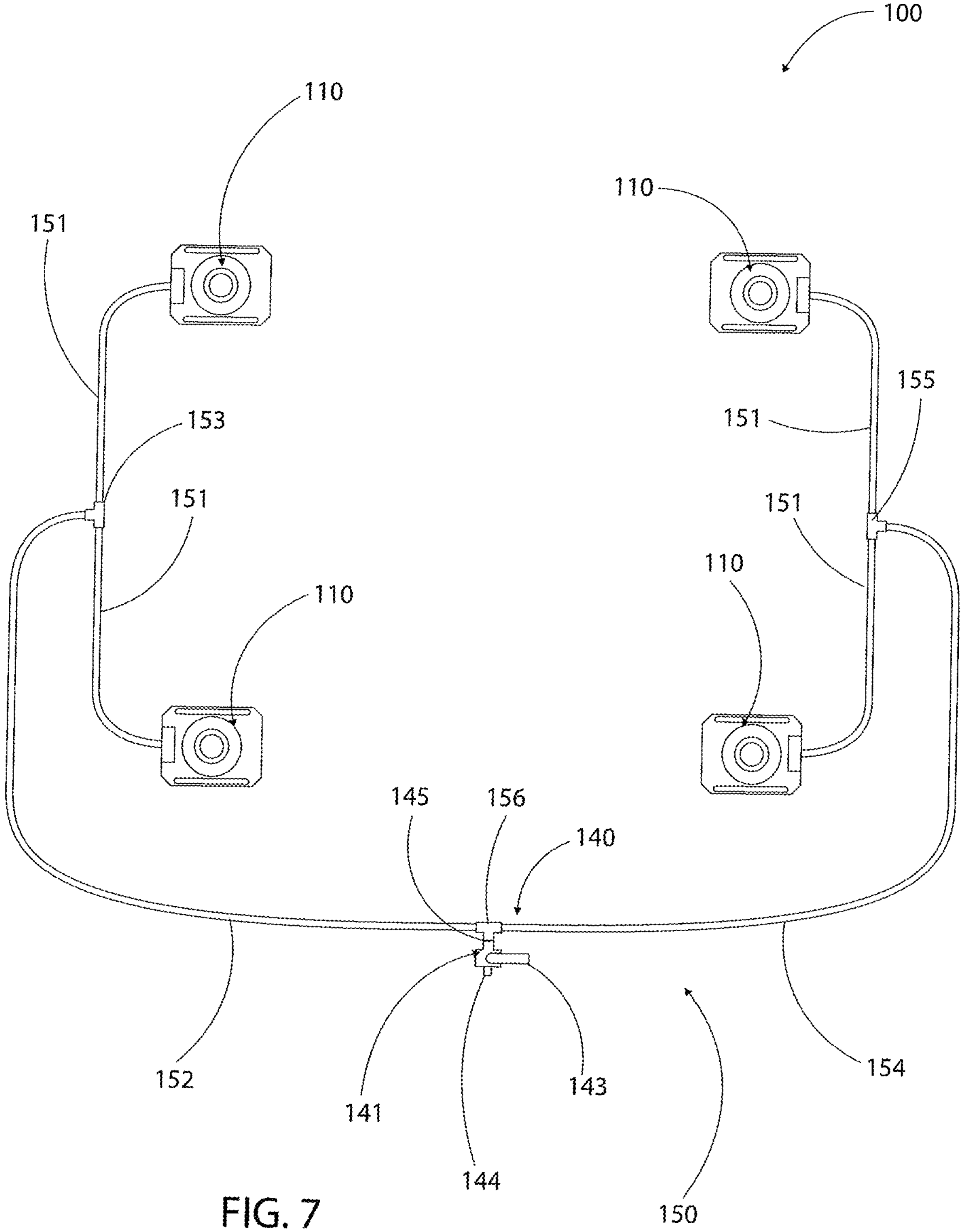
FIG. 7 is a pictorial diagram of the system, including an air-line assembly and a set of inflatable devices, according to an embodiment of the present disclosure.
Figure 8:
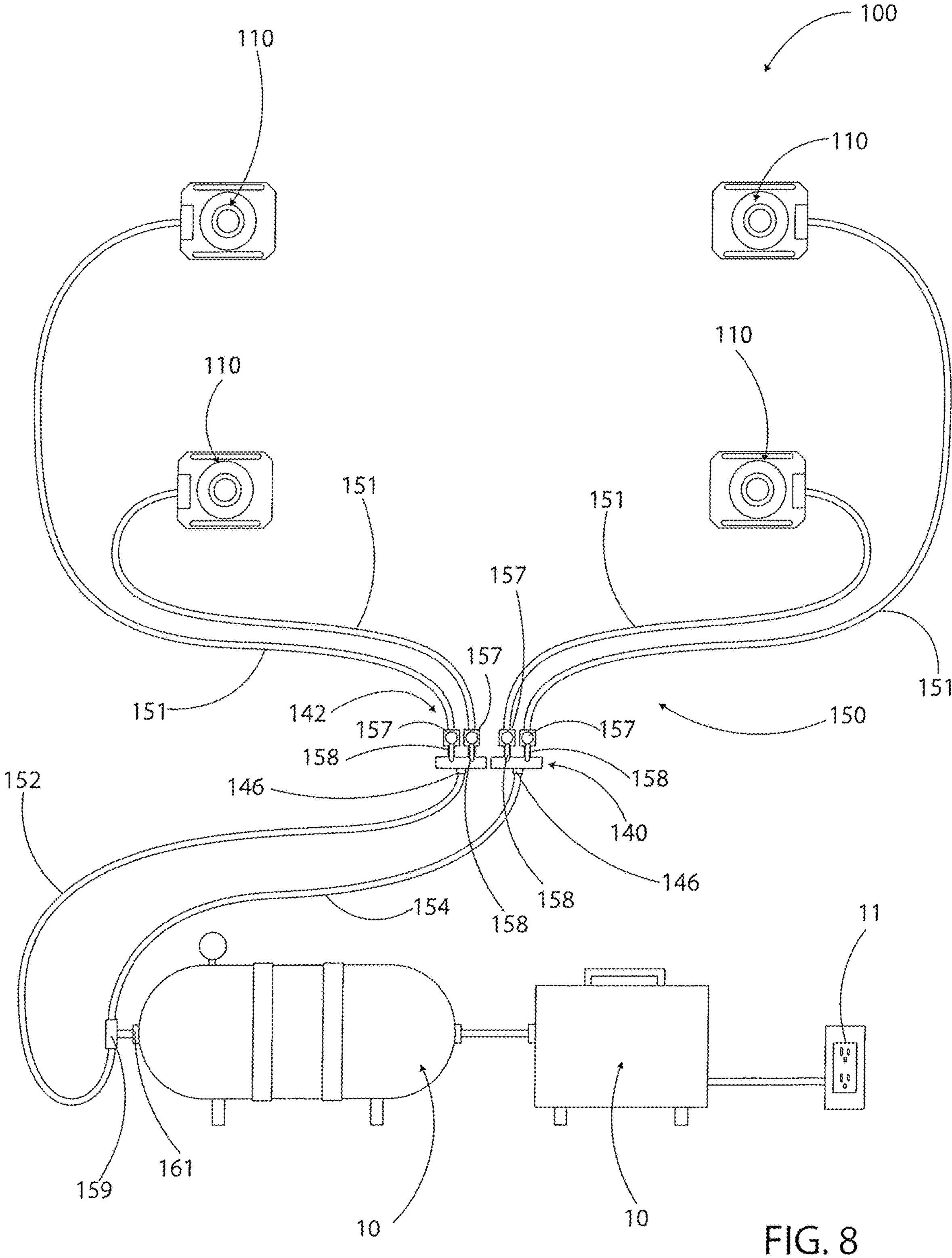
FIG. 8 is a pictorial diagram of the system, including the air-line assembly and the set of inflatable devices, according to another embodiment of the present disclosure.

As shown specifically via pictorial diagrams in FIGS. 7-8, the air-line assembly 130 may include a conduit system 150 and a main control valve 140. The main control valve 140 may be configured for connection with a compressed air supply 10 (FIG. 8) to intake the compressed air through the air-line assembly 130. This connection may be direct or indirect. In some examples, compressed air supply 10 may be a compressed air tank, an air compressor, or both (as shown in FIG. 8). As such, as also shown in FIG. 8, the air compressor may be connected to a power supply 11. In some embodiments, these may be auxiliary to system 100. As such, system 100 may be configured for use with any existing compressed air supply 10.

The conduit system 150 may be configured to supply the compressed air from the main control valve 140 (when connected/in communication with the compressed air supply 10) to the inlet 121 of each of the set of inflatable devices 110, thereby moving the set of inflatable devices 110 into the inflated position 123 and lifting the vehicle 5. Particularly, the conduit system 150 may include one device conduit 151 per inflatable device 110. For example, as shown in FIGS. 7-8, the conduit system 150 may include four device conduits 151 and each of the four device conduits 151 may be configured for connection, at one end, with the inlet 121 of one of the four inflatable devices 110. The device conduits 151 may include one of a female or male interface (i.e., a female interface 162 as shown in FIG. 3) and the inlet 121 of the inflatable devices 15 may include another one of the female or male interfaces (i.e., a male interface 126 as shown in FIG. 3) to connect the device conduits 151 to the inlets 121. In some embodiments, the female interfaces and the male interfaces may be quick connectors.

The four device conduits 151 may then attach, at another end, with the main control valve 140 (or at least placed in communication with the main control valve via additional conduits, as will be discussed below). In some embodiments, the set of inflatable devices 110 may be moved into the inflated position 123 simultaneously. In some examples of this embodiment, as demonstrated via the diagram in FIG. 7, the main control valve 140 may include a single open and close valve 141. For example, the single open and close valve 141 may include a ball valve having a first handle 143 mounted to an exterior of the single open and close valve 141 for easy opening and closing thereof.

The conduit system 150 may further include a pair of conduits. For the sake of clarity, the pair of conduits will be discussed and illustrated with two separate reference numbers but it should be appreciated that the pair of conduits are contemplated to be identical and interchangeable. As shown in FIGS. 7-8, the pair of conduits may include a first main conduit 152 and a second main conduit 154.

As shown specifically in FIG. 7, in some embodiments, the first main conduit 152 may be placed at a first side (relative to the vehicle 5), i.e., a left side, and the second main conduit 154 may be placed at a second side (relative to the vehicle 5), i.e., a right side. In this embodiment, a first connector 153 may be provided and configured to connect two of the four device conduits 151 together and also connect the connect two of the four device conduits to the first main conduit 152. For example, the first connector 153 may be a T-fitting (or a Y-fitting) configured to connect together the device conduits 151 that are attached to inflatable devices 110 on the first side of the vehicle 5, and also attach these device conduits 151 to the first main conduit 152.

Similarly, a second connector 155 may connect another two of the four device conduits 151 together and to the second main conduit 154. Again, for example, the second connector 155 may also be a T-fitting (or again a Y-fitting) configured to connect together the device conduits 151 that are attached to inflatable devices 110 on the second side of the vehicle 5 together, and to also attach these device conduits 151 to the second main conduit 154. Further, a third connector 156 may be provided and configured to connect the first main conduit 152 and the second main conduit 154 to an output portion 145 of the main control valve 140 (in this example single open and close valve 141). Thereby placing the device conduits 151 in communication with the main control valve 140.

In some embodiments, the main control valve 140 (in the example illustrated in FIG. 7, the single open and close valve 141) may include a male interface 144 configured to mate with a female interface (not illustrated) on the compressed air supply 10. As such, once the main control valve 140 is connected to the compressed air supply 10 and the system 100 is ready to accept the compressed air (valve(s) are open), the compressed air may travel from the compressed air supply 10, through the main control valve 140 (again, in this example the single open and close valve 141), into each of the main conduits 152, 154, through the device conduits 151 and into the inflatable devices 110 simultaneously, thereby moving the set of inflatable devices 110 into the inflated position 123 simultaneously.

Another example is demonstrated via the diagram in FIG. 8, which enables the set of inflatable devices 110 to be moved into the inflated position 123 both simultaneously or independently. As shown, in this example the main control valve 140 may include a quadruple 4-way valve 142. The conduit system 150 may again include one device conduit 151 per inflatable device 110 (particularly four device conduits 151 for the four inflatable devices 110). As shown in FIG. 8, the quadruple 4-way valve 142 may include four outlets 157 having four independent valves that that are independently connectable to one of the four device conduits 151. In some examples, the valves may each include a ball valve having a second handle 158 mounted to an exterior of the quadruple 4-way valve 142 for easy opening and closing of the valve.

In this embodiment, the compressed air may be supplied to the quadruple 4-way valve 142 via two airlines (rather than the main control valve 140 being directly connected to the compressed air supply 10 as in the embodiment discussed above and demonstrated in FIG. 7). For example, in this embodiment, the pair of conduits 152, 154 may be used to connect to, at one end, the compressed air supply 10 and connect, at another end, to the quadruple 4-way valve 142; thereby enabling the supply of the compressed air to the quadruple 4-way valve 142. In this embodiment, the first main conduit 152 and the second main conduit 154 may be configured to connect to an input portion 146 of the main control valve 140 (the quadruple 4-way valve 142 in this example), as shown in FIG. 8. A fourth connector 159 may be provided and configured to connect the pair of conduits 152, 154 together and to the compressed air supply 10. The fourth connector 159 may include an interface, (i.e., a male interface 161), for mating with the female interface (not illustrated) on the compressed air supply 10.

The quadruple 4-way valve 142 may enable a user to independently prevent or allow the compressed air to move into each device conduit 151 (and thus each inflatable devices 110) independently. As such, to independently move the set of inflatable devices 110 into the inflated position 123, once the compressed air supply 10 has been connected to the quadruple 4-way valve 142, the user may, one by one, open each valve/outlet 157. For example, the user may open one valve/outlet 157, wait until the inflatable device 110 connected to that valve/outlet 157 is in the inflated position 123, and then open another valve/outlet 157 to inflate another inflatable device 110. To enable the set of inflatable devices 110 to be moved into the inflated position 123 simultaneously (using the quadruple 4-way valve 142), the user may simply open all valves 157 to permit the compressed air to simultaneously move through the four device conduits 151 and into the four inflatable devices 110.

Figure 9:
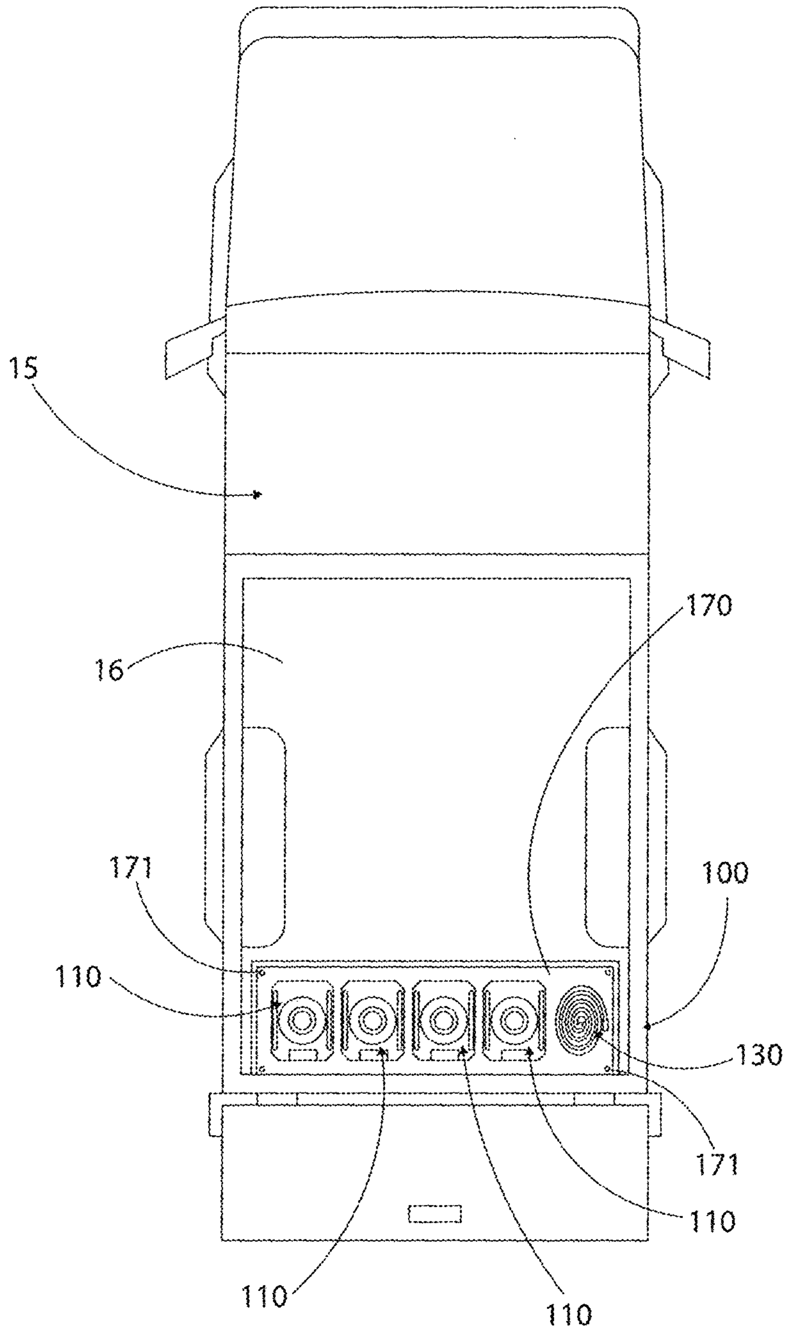
FIG. 9 is a pictorial diagram of the system being stored in the bed of a truck, according to another embodiment of the present disclosure.

In additional embodiments, the system 100 may be constructed to be a mobile system. In this embodiment, as shown in FIG. 9, system 100 may be stored or incorporated into bed 16 of a truck 15, enabling individuals to transport the system 100 to different jobs. For example, in this embodiment, system 100 may include a fitted mold 170 securing the set of inflatable devices 110 and the air-line assembly 130 therein. The fitted mold 170 may include anchor points 171 that may enable the user to bolt the fitted mold 170 to the bed 16 of the truck 15. Further, in this embodiment, the system 100 may be made of or constructed with lightweight materials. For example, instead of steel, the inflatable devices 110 may include aluminum.

Figure 10:
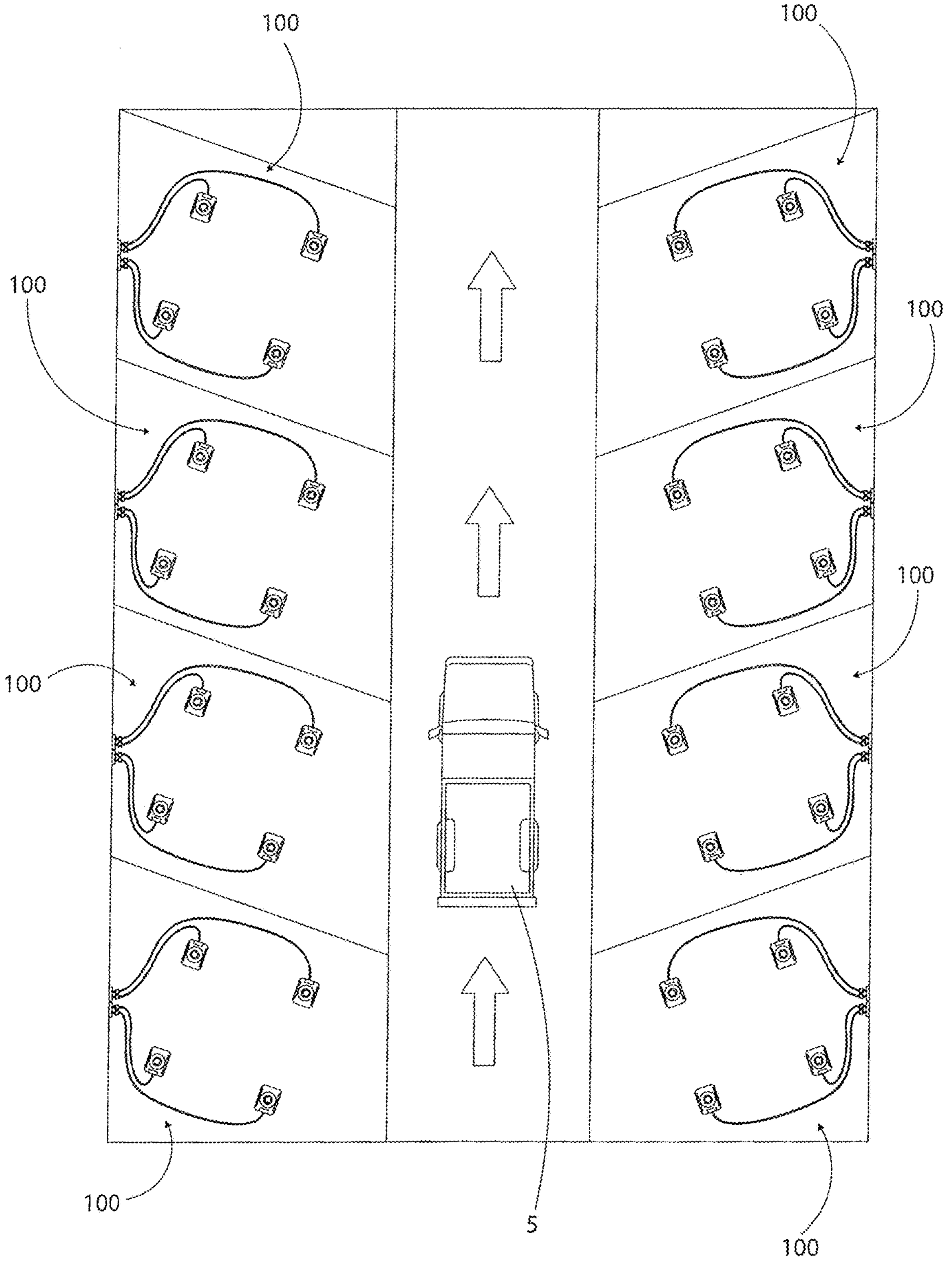
FIG. 10 is a pictorial diagram of a plurality of systems, according to another embodiment of the present disclosure.
Figure 11:
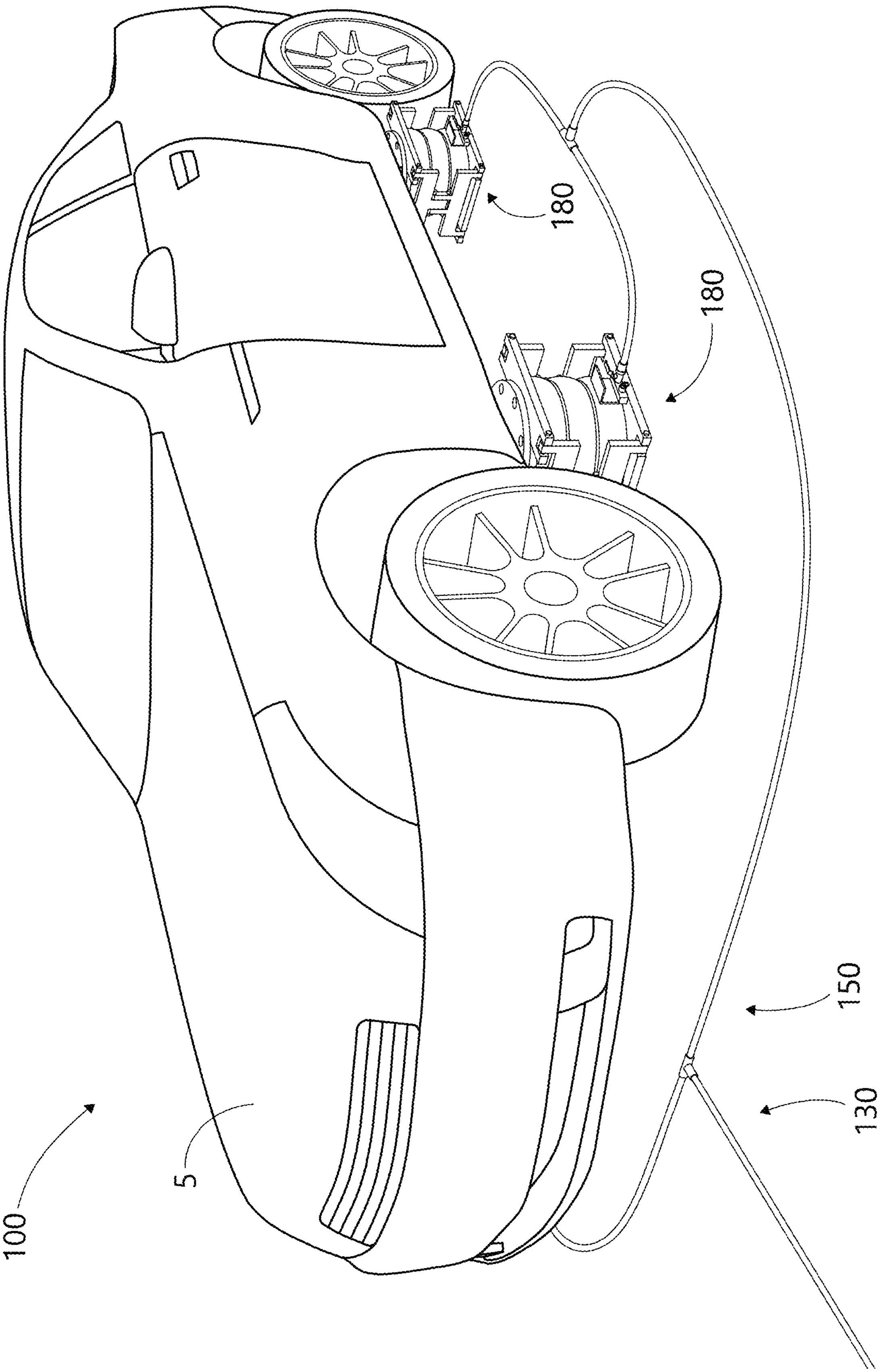
FIG. 11 is a front perspective view of a vehicle air lift system according to an another embodiment of the disclosure shown being used to lift a vehicle using compressed air.
Figure 12:
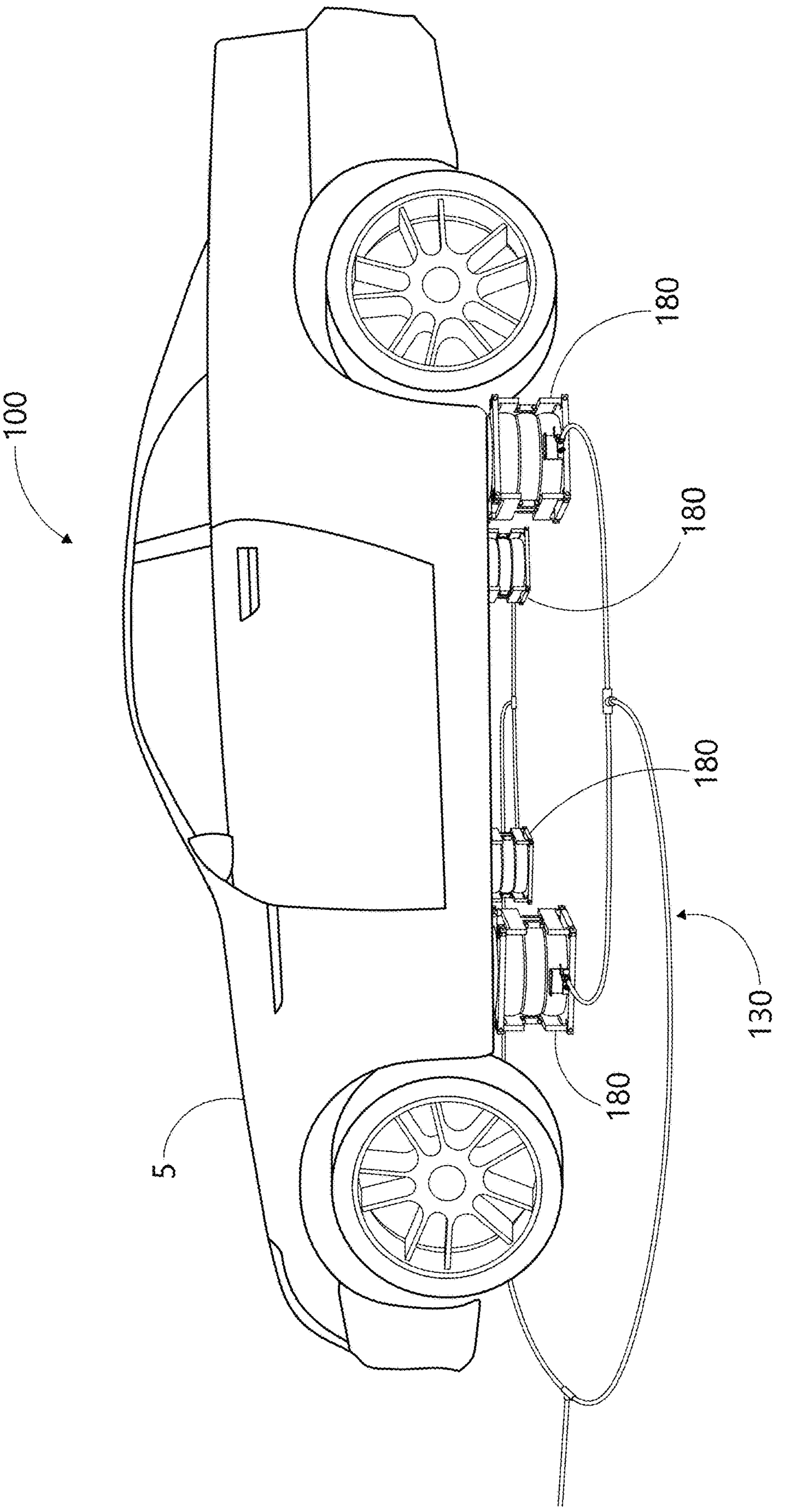
FIG. 12 is a side perspective view of the system of FIG. 11, according to an embodiment of the present disclosure.

It is also contemplated that the system 100 may be utilized in various applications. In particular, the system 100 may be particularly useful for mechanic stores, tire stores, etc. For example, as shown in FIG. 10, the system 100 may be provided in a 'tire store' arranged as a 'drive-thru tire swap center' having a plurality of bays each sized for a vehicle 5 to drive into. Each bay may include one of the systems 100 positioned and ready for use. As such, the vehicle 5 may be driven into a bay, positioned such that each of the set of inflatable devices 110 abut jacking points of the vehicle 5, and the compressed air supply 10 (FIG. 8) may be switched on to inflate the inflatable devices 110 and lift the vehicle 5.

In FIGS. 11-17 there is shown an inflatable device(s) 180 according to another embodiment. Inflatable device 180 is constructed similar to inflatable device(s) 110 and similar elements between the embodiments share the same reference numbers. Inflatable devices 180 may replace inflatable devices 110 in the system 100. As shown, inflatable device 180 includes an articulated frame 182 that operates to further support a lifted vehicle. Particularly, frame 182 provides rigidity to device 180 and, when engaged in its extended position, prevents collapse if airbag 114 is deflated.

Frame 182 has a top plate 184, a bottom plate 186, and a pair of articulating sides 188 that are attached to and extend between the top and bottom plates. Top plate 184 may further have a bearing plate 185 for contacting the underside of a vehicle for lifting. Bottom plate 186 replaces base 111. An airbag 114 is disposed between the top and bottom plates 184 and 186 and between the sides 188. Each side 188 has a first or upper hinge plate 190 and a second or lower hinge plate 192. The upper hinge plate 190 is hingedly connected at one edge to a respective edge of the top plate 184 by couplings 194 for rotation relative to the top plate. The lower hinge plate 192 is hingedly connected at one edge to a respective edge of the bottom plate 186 by couplings 196 for rotation relative to the bottom plate.

Figure 13:
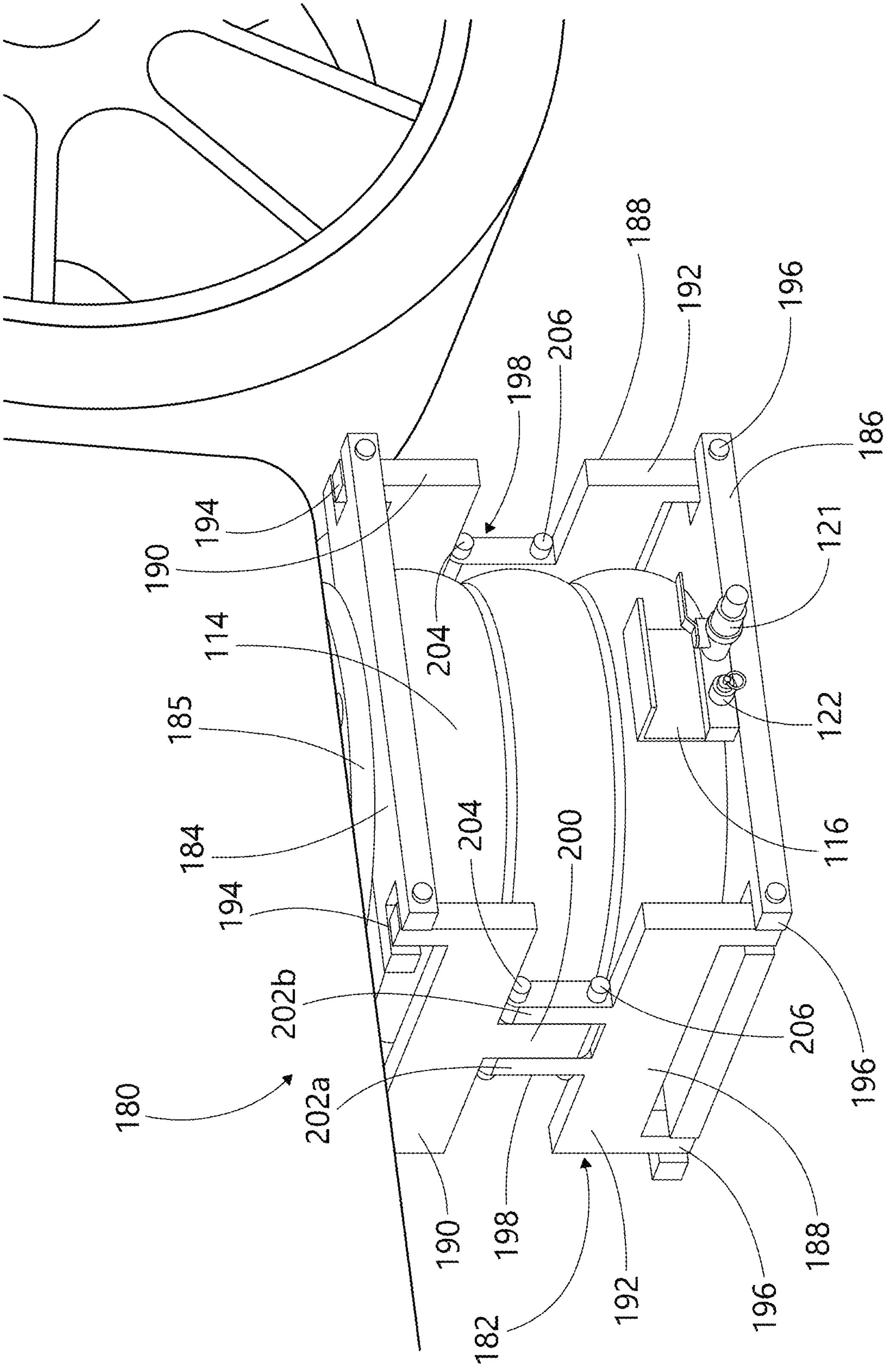
FIG. 13 is a close-up view of the system of FIG. 12 and illustrates an inflatable device according to an embodiment of the present disclosure.
Figure 14:
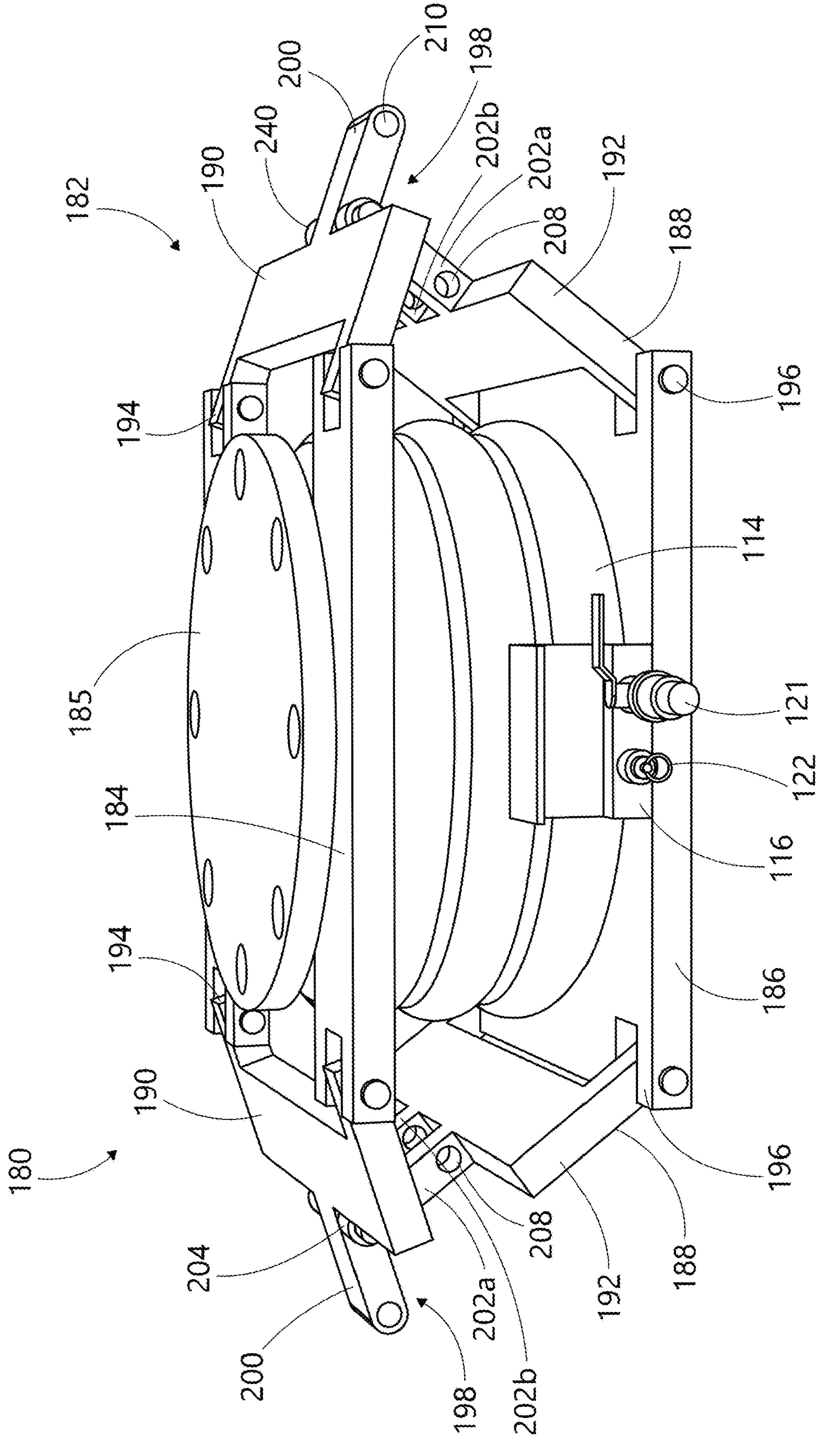
FIG. 14 is a rear perspective view of the inflatable device according to an embodiment of the present disclosure.
Figure 15:
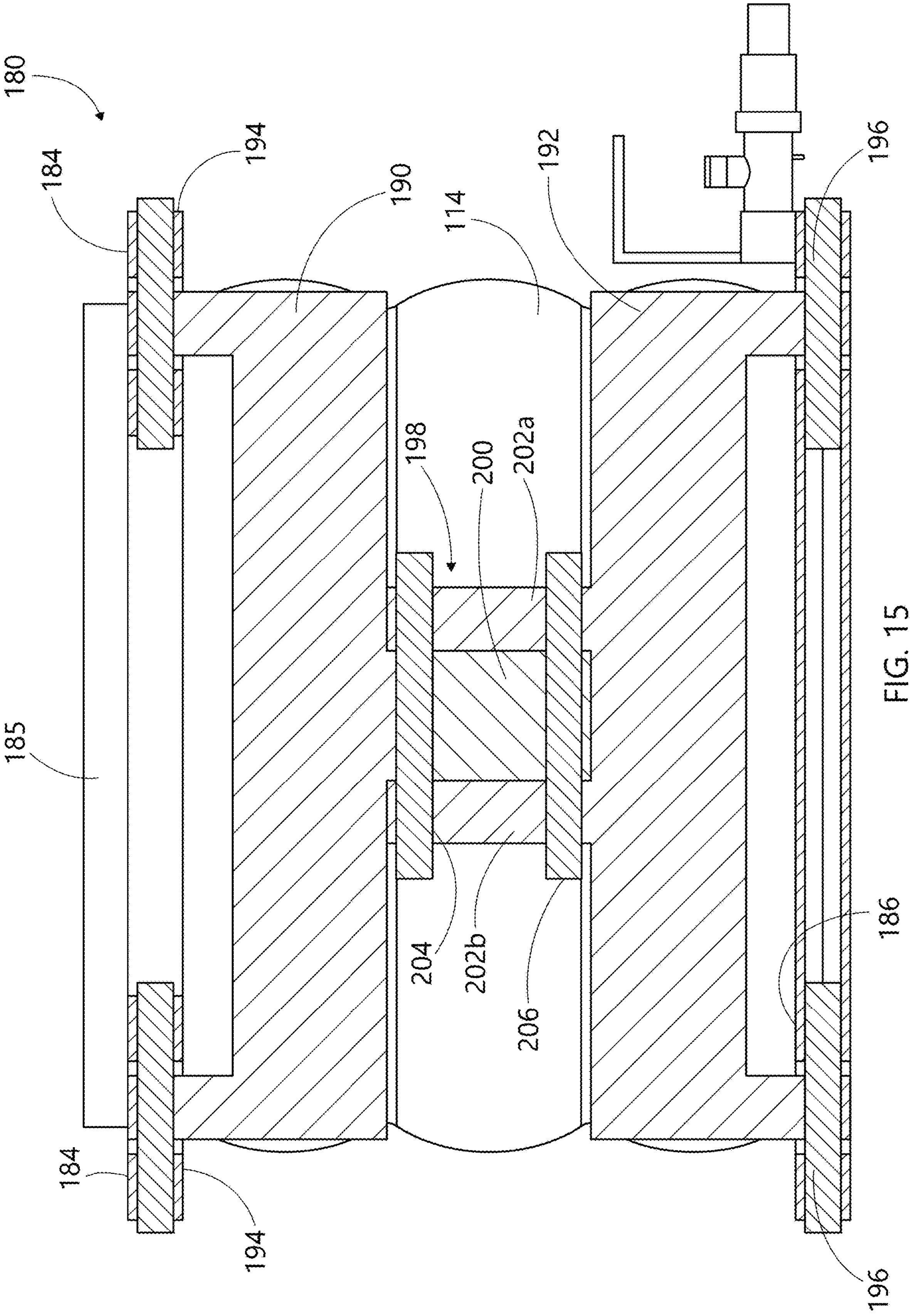
FIG. 15 is a cross-sectional view of the inflatable device according to an embodiment of the present disclosure.

The upper hinge plate 190 and the lower hinge plate 192 are hingedly connected by a finger joint 198. Representatively shown, finger joint 198 has a first finger-like projection 200 that extends outwardly from an edge of the upper hinge plate 190 that is opposite of its hinged connection with the top plate 184. The finger joint further has spaced second and third finger-like projections 202*a* and 202*b* that extend outwardly from an edge of the lower hinge plate 192 that is opposite its hinged connection with the bottom plate 186. The first projection 200 is disposed between the second and third projections 202*a* and 202*b* and is pivotally connected therewith by coupling 204, thereby hingedly connecting the upper hinge plate 190 and the lower hinge plate 192. To this end, frame 182 is positionable in an extended position as seen in FIG. 13 and a collapsed position as seen in FIG. 14.

Coupling 204 is located at an outward position along the length of projections 202*a* and 202*b* and at an inward position of projection 200. To this end, rotation of the upper and lower hinge plates 190 and 192 causes projection 200 to rotate between projections 202*a* and 202*b*. Frame 182, in its extended position (FIG. 13), positions projection 200 coextensively with projections 202*a* and 202*b*. A locking pin 206 is removably insertable through cooperatively aligned holes 208 in projections 202*a* and 202*b* and hole 210 in projection 200. With the locking pin 206 inserted in holes 208 and 210, rotation of the upper and lower hinge plates 190 and 192 is prevented. Frame 182 is locked in its extended position by locking the hinge plates 190 and 192 of each side 188 by a respective locking pin 206.

Inflating airbag 114 from a deflated state to an inflated state causes articulation of sides 188 of frame 182 as the top plate 184 and bottom plate 186 are moved in a direction away from each other. When fully inflated, hinge plates 190 and 192 of each side 188 are positioned end-to-end with holes 208 and 210 cooperatively aligned to receive a locking pin 206 to lock frame 182 in its extended, load-bearing position. In this locked configuration, frame 182 will not collapse if airbag 114 is deflated or unexpectedly loses inflation. Accordingly, frame 182, when locked in its extended position, provides additional safety to system 100 when lifting a vehicle.

It will be appreciated by persons skilled in the art that the present embodiment is not limited to what has been particularly shown and described hereinabove. A variety of modifications and variations are possible in light of the above teachings without departing from the scope of the disclosure.

What is claimed is:

1. An inflatable device for lifting a vehicle, the inflatable device comprising:

a frame having a top plate, a bottom plate, and a pair of articulating sides attached to and extending between the top and bottom plates, wherein articulation of the sides allows the upper plate and lower plate to move toward and away from each other between a collapsed position and an extended position;

an inflatable airbag disposed between the upper and lower plate and between the pair of articulating sides;

the frame being moved from the collapsed position into the extended position by inflation of the airbag;

the frame being releasably lockable in the extended position to prevent the frame collapsing upon deflation of the airbag; and wherein each articulating side includes a locking pin removably insertable through cooperating holes in the finger joint to lock the first and second hinge plates against relative rotation to each other.

2. The inflatable device of claim 1, wherein each articulating side has a first hinge plate and a second hinge plate, the first hinge plate hingedly connected at one end thereof to a respective side edge of the top plate, the second hinge plate hingedly connected at one end thereof to a respective side edge of the bottom plate, and the first and second hinge plates hingedly connected.

3. The inflatable device of claim 2, wherein each articulating side includes a finger joint and wherein the first and second hinge plates are hingedly connected at the finger joint.

4. The inflatable device of claim 1, further comprising:

an inflation control connected in fluid communication with an interior of the airbag, the inflation control unit including an inlet.

5. An inflatable device for lifting a vehicle, the inflatable device comprising:

a frame having a top plate, a bottom plate, and a pair of articulating sides attached to and extending between the top and bottom plates, wherein articulation of the sides allows the upper plate and lower plate to move toward and away from each other between a collapsed position and an extended position;

each articulating side having a first hinge plate, a second hinge plate, and a finger joint, the first hinge plate hingedly connected at a first end thereof to a corresponding side edge of the top plate, the second hinge plate hingedly connected at a first end thereof to a corresponding side edge of the bottom plate, the first and second hinge plates hingedly connected at the finger joint, each articulating side further having a locking pin removably insertable through cooperating holes in the finger joint to lock the first and second hinge plates against relative rotation to each other;

an inflatable airbag disposed between the upper and lower plate and between the pair of articulating sides; and the frame being moved from the collapsed position into the extended position by inflation of the airbag.

6. The inflatable device of claim 5, further comprising:

an inflation control unit connected in fluid communication with an interior of the airbag, the inflation control unit including an inlet.

7. The inflatable device of claim 6, wherein the inflation control unit further includes an outlet configured to expel the compressed air from the common interior.

8. A system for lifting a vehicle using compressed air comprising:

a set of inflatable devices configured for movement between an inflated position and a deflated position, the set of inflatable devices including a greater height in the inflated position than in the deflated position, the set of inflatable devices each including:

a frame having a top plate, a bottom plate, and a pair of articulating sides attached to and extending between the top and bottom plates, wherein articulation of the sides allows the upper plate and lower plate to move toward and away from each other between a collapsed position and an extended position;

wherein each articulating side includes a locking pin removably insertable through cooperating holes in the finger joint to lock the first and second hinge plates against relative rotation to each other;

an inflatable airbag disposed between the upper and lower plate and between the pair of articulating sides;

the frame being moved from the collapsed position into the extended position by inflation of the airbag; and the frame being releasably lockable in the extended position to prevent the frame collapsing upon deflation of the airbag;

an inflation control unit connected in fluid communication with an interior of the airbag, the inflation control unit including an inlet; and an air-line assembly configured to selectively supply compressed air to the set of inflatable devices, the air-line assembly including a conduit system and a main control valve, the main control valve configured for connection with a compressed air supply to intake the compressed air into the air-line assembly, the conduit system configured to supply the compressed air to the inlet of each of the set of inflatable devices, thereby moving the set of inflatable devices into the inflated position and lifting the vehicle.

9. The system of claim 8, wherein the set of inflatable devices are moved into the inflated position simultaneously.

10. The system of claim 9, wherein the set of inflatable devices are moved into the inflated position independently.

11. The system of claim 10, wherein the set of inflatable devices includes four inflatable devices.

12. The system of claim 11, wherein the conduit system includes four device conduits, and wherein each of the four device conduits are configured for connection with the inlet of one of the four inflatable devices.

13. The system of claim 12, wherein the conduit system further includes a pair of main conduits, the pair of main conduits including a first main conduit and a second main conduit.

14. The system of claim 13, wherein the main control valve includes a quadruple 4-way valve.

15. The system of claim 13, wherein the main control valve includes a single open and close valve.

16. The system of claim 15, wherein the conduit system further includes a first connector configured to connect two of the four device conduits together and to the first main conduit, wherein the conduit system further includes a second connector configured to connect another two of the four device conduits together and to the second main conduit, and wherein the conduit system further includes a third connector configured to connect the first main conduit and the second main conduit to an output portion of the main control valve.

17. The system of claim 16, wherein the first main conduit and the second main conduit are configured to connect to an input portion of the main control valve and wherein the conduit system further includes a fourth connector configured to connect the first main conduit and the second main conduit together and to the compressed air supply.

18. The system of claim 8, wherein the inflation control unit further includes an outlet configured to expel the compressed air from the common interior.

* * * * *